US010436625B2

(12) United States Patent
Bridge et al.

(10) Patent No.: US 10,436,625 B2
(45) Date of Patent: Oct. 8, 2019

(54) INTERFEROMETRIC DOPPLER RADAR AND METHOD FOR WAVE AND WATER LEVEL MEASUREMENT

(71) Applicants: University of Florida Research Foundation, Inc., Gainesville, FL (US); Texas Tech University Systems, Lubbock, TX (US)

(72) Inventors: Jennifer Anne Bridge, Gainesville, FL (US); Changzhi Li, Lubbock, TX (US); Changzhan Gu, Sunnyvale, CA (US); Justin R. Davis, Gainesville, FL (US)

(73) Assignees: UNIVERSITY OF FLORIDA RESEARCH FOUNDATION, INC., Gainesville, FL (US); TEXAS TECH UNIVERSITY SYSTEMS, Lubbock, TX (US)

( * ) Notice: Subject to any disclaimer, the term of this patent is extended or adjusted under 35 U.S.C. 154(b) by 427 days.

(21) Appl. No.: 15/000,776

(22) Filed: Jan. 19, 2016

(65) Prior Publication Data

US 2016/0209260 A1    Jul. 21, 2016

Related U.S. Application Data

(60) Provisional application No. 62/105,009, filed on Jan. 19, 2015.

(51) Int. Cl.
*G01F 23/284* (2006.01)
*G01S 13/87* (2006.01)
(Continued)

(52) U.S. Cl.
CPC ............ *G01F 23/284* (2013.01); *G01S 7/003* (2013.01); *G01S 13/36* (2013.01); *G01S 13/583* (2013.01);
(Continued)

(58) Field of Classification Search
CPC ........ G01F 23/284; G01S 7/003; G01S 13/36; G01S 13/583; G01S 13/70; G01S 13/87; G01S 13/88; G01S 2007/358
(Continued)

(56) References Cited

U.S. PATENT DOCUMENTS

| 7,486,226 B2 | 2/2009 | Edvardsson |
| 8,994,546 B2 * | 3/2015 | Breed .................. G01J 5/0846 340/426.19 |

(Continued)

FOREIGN PATENT DOCUMENTS

| CN | 203337220 | 12/2013 |
| CN | 203349899 | 12/2013 |
| WO | 2014005099 | 1/2014 |

OTHER PUBLICATIONS

Machine Translation of EP15175162, published Jun. 2017 (Year: 2017).*

(Continued)

*Primary Examiner* — Frank J McGue
(74) *Attorney, Agent, or Firm* — Thomas | Horstemeyer, LLP

(57) ABSTRACT

Devices, methods and systems for wave and water level measurement using a single DC (direct current)-coupled CW (continuous wave) Doppler radar for detecting water elevation changes in time when installed up to several meters from the water surface. The radar is wireless and can stream continuous data to a local PC (personal computer) or base station in range of its radio. The radar can sample up to 40 Hz and can run on batteries for continuous sampling. The radars can include multiple radar configurations of 1, 2 and 4 radar configurations. Applications for this radar can include the measurement of beach run-up, free surface
(Continued)

elevation in tidal zones, and storm surge elevations near bridges and critical infrastructure during storm events.

17 Claims, 14 Drawing Sheets

(51) Int. Cl.
| | | |
|---|---|---|
| *G01S 7/00* | (2006.01) | |
| *G01S 13/36* | (2006.01) | |
| *G01S 13/58* | (2006.01) | |
| *G01S 13/70* | (2006.01) | |
| *G01S 13/88* | (2006.01) | |
| *G01S 7/35* | (2006.01) | |

(52) U.S. Cl.
CPC .............. *G01S 13/70* (2013.01); *G01S 13/87* (2013.01); *G01S 13/88* (2013.01); *G01S 2007/358* (2013.01)

(58) Field of Classification Search
USPC .......................................................... 342/124
See application file for complete search history.

(56) References Cited

U.S. PATENT DOCUMENTS

| | | | |
|---|---|---|---|
| 2009/0219192 A1 | 9/2009 | Algra | |
| 2010/0097231 A1* | 4/2010 | Elsenhans | G01F 23/265 340/618 |
| 2010/0162818 A1* | 7/2010 | David | G01F 23/284 73/592 |
| 2010/0175470 A1* | 7/2010 | Schrier | G01F 23/284 73/290 V |
| 2012/0265486 A1* | 10/2012 | Klofer | G01F 23/0061 702/166 |
| 2013/0169468 A1* | 7/2013 | Johnson | G01S 13/02 342/41 |
| 2014/0015546 A1* | 1/2014 | Frederick | G01B 7/14 324/642 |
| 2017/0016984 A1* | 1/2017 | Lin | G01S 13/584 |
| 2017/0176236 A1* | 6/2017 | Corbe | G01F 23/284 |

OTHER PUBLICATIONS

Park et al., "Arctangent Demodulation With DC Offset Compensation in Quadrature Doppler Radar Receiver Systems", IEEE Transactions on Microwave Theory and Techniques, vol. 55, No. 5, May 2007 (Year: 2007).*
Wikipedia article, "Continuous Wave", Feb. 21, 2018 version (Year: 2018).*
Costa, et al., Use of Radars to Monitor Stream Discharge by Noncontact Methods, Water Resources Research, 2006, pp. 1-14, vol. 42.
Fulford, et al., Accuracy of Radar Water Level Measurements, USCID Fourth International Conference on Irrigation and Drainage, 2007, 12 pages.
Emerson Process Management, Rosemount 5900S Radar Level Gauge, retrieved on Jan. 6, 2016, retrieved from http://www2/emersonprocess.com/en-US/brands/rosemounttankgauging/products/raptor/level/pages/rosemount%205900s.aspx, 1 page.
Wang, et al., Highly Accurate Noncontact Water Level Monitoring using Continuous-Wave Doppler Radar, Proceedings of IEEE Radio and Wireless Symposium, Austin, Texas, Jan. 20-23, 2013, pp. 19-21.
Gu, et al., Noncontact Large-Scale Displacement Tracking: Doppler Radar for Water Level Gauging, IEEE Microwave and Wireless Components Letters, Dec. 1, 2014, pp. 899-901, vol. 24, No. 12.
Motherwell Tank Gauging, 8900d High Accuracy Fmcw Radar Tank Level Gauge, retrieved on Jan. 7, 2016, retrieved from http://www.motherwelltankgauging.co.uk/products/tank-gauges/radar-gauges/, 2 pages.
Motherwell Tank Gauging, Datasheet, Digital Microwave Tank Gauge, 8900d Digital Radar, retrieved on Jan. 7, 2016, retrieved from www.motherwelltankgauging.co.uk, 2 pages.
Motherwell Tank Gauging, Datasheet, MTG mPuls 62, Radar Level Gauge, retrieved on Jan. 7, 2016, retrieved from www.motherwelltankgauging.co.uk, 2 pages.

* cited by examiner

Beach run-up tests: short duration

Beach run-up tests: short duration

Beach run-up tests: long duration

Side view of wave flume

Top view of wave flume 10-cm solitary wave flume test 20-cm solitary wave flume test Signal processing flow chart Rain barrel test setup Multiple radar beach run-up test set up plan view diagram Multiple radar beach run-up test results Multiple radar data communication flowchart for one, two, or four radars

INTERFEROMETRIC DOPPLER RADAR AND METHOD FOR WAVE AND WATER LEVEL MEASUREMENT

This application claims the benefit of priority to U.S. Provisional Patent Application Ser. No. 62/105,009 filed Jan. 19, 2015, which is incorporated by reference in its' entirety.

FIELD OF THE INVENTION

This invention relates to water monitoring equipment and, in particular, to methods, systems and devices for continuous wave (CW) interferometric Doppler radar wave and water level indicator using wireless radar sensor for displacement and distance measurement in time including water surface elevation and characteristic measurement integrated as a single device or a network of devices for applications such as storm surge tracking and tidal zone assessment.

BACKGROUND AND PRIOR ART

Traditional water level gauging instruments are generally in contact with the water itself (susceptible to biofouling) or include relatively expensive non-contact equipment that is relatively inaccurate when used.

Some traditional water level gauging method consists of a massive station house, a gauge shaft and a measuring unit. It is costly to build up the station and requires a lot of permanent maintenance.

New technologies have been introduced for water level gauging, such as Radar, ultrasonic, and laser. Ultrasonic has low accuracy due to its long wavelength resolution. Laser sensors are costly and not easy to be installed for long-term gauging. Radar sensor is a more attractive approach.

Existing radar level gauging techniques mainly include pulse radar and frequency modulated continuous wave (FMCW) radar. However, pulse radar is usually not desirable due to the low measurement accuracy unless an expensive data converter is used. FMCW radar, on the other hand, suffers from multipath echoes reflected from various objects around the water body, which limits the radar resolution and is also inaccurate.

Microwave radar has become an attractive approach for noncontact displacement and distance measurement. The conventional Doppler radar technique has been used for small-scale displacement detection, e.g., vital signs of respiration and heartbeat (amplitude is less than a few cm). The small displacement is negligible compared to the distance between the subject and the radar. Therefore, the amplitudes of the measured signals and the DC offset at RF output are almost constant, and typically the phase modulation does not exceed 180 degrees (half carrier wavelength). Arctangent demodulation with prefixed DC calibration is sufficient to recover the phase information of the small-scale displacement. However, if the displacement is so large that it is comparable to the distance between the subject and the radar, e.g. in the case of radar water level gauging, it would significantly affect the power received at the radar input and the baseband signals would be subject to inconstant amplitude and dynamically varying DC offset. Moreover, the large displacement inevitably leads to phase ambiguity in the conventional arctangent demodulation.

While many radar gauging devices are research projects in academic institutions, commercial businesses can include Campbell Scientific, which provides a pulse radar sensor that is subject to lower accuracy in water level displacement measurement compared to CW radar; OTT RLS Radar Level Sensor product that has low accuracy of 0.01 ft and measures water level every 20 seconds—not continuously; VAISALA is another example of a pulse radar sensor, subject to lower accuracy and higher hardware complexity. in water level displacement measurement in comparison to CW radar; and VEGAPULS which is based on ultrasonic signals.

To solve the problems with existing radar level gauging techniques, a water level gauging technique is needed that is based on a DC (direct current)-coupled CW Doppler radar sensor. Unlike the conventional AC-(alternating current) coupled Doppler radar sensor, which suffers from signal distortion when measuring the slow movement of water level motion, this radar gauging technique employs a DC-coupled architecture that allows accurate measurement of the slow-varying water level. It is also immune from the interference of multipath echoes, which exist in FMCW radar, because the clutter reflections from surrounding stationary objects only produce a DC offset at the RF (radio frequency) output. The DC offset can be easily compensated by the baseband adaptive-tuning architecture, and the technique has sub-millimeter accuracy.

SUMMARY OF THE INVENTION

A primary objective of the present invention is to provide methods, systems and devices for a single DC-coupled CW Doppler radar that is capable of detecting water elevation changes in time for maximizing measurement accuracy and resolution.

A secondary objective of the present invention is to provide methods, systems and devices for providing a wireless and low-cost radar sensor that accurately measure water surface elevation in real time that is compact and uses low power.

A third objective of the present invention is to provide methods, systems and devices for providing a wireless radar device that can stream continuous data to a local computing device or base station in range of the radar device radio transmitter.

A fourth objective of the present invention is to provide methods, systems and devices that accurately measure water surface elevation which can use an embedded processor, enabling data processing at a sensor location and provides wireless transmission to a computer or base station.

A fifth objective of the present invention is to provide methods, systems and devices that accurately measure water surface elevation which uses a non-contact measurement approach, eliminating any potential interference from biologic growth or anthropogenic contaminant exposure.

A sixth objective of the present invention is to provide methods, systems and devices that accurately measure water surface elevation that can group sensors to work as a network, enabling assessment of spatial variability in tidal zones and run-up regions.

A seventh objective of the present invention is to provide methods, systems and devices for wireless radar measurement and sensing device that can measure beach run-up, free surface elevation in tidal zones and storm surge elevations near bridges and or other critical infrastructure during storm events.

An eighth objective of the present invention is to provide methods, systems and devices for wireless radar measurement and sensing device that can measure beach run-up, free surface elevation in tidal zones and storm surge elevations near bridges and or other critical infrastructure during storm events.

A ninth objective of the present invention is to provide methods, systems and devices for a radar displacement and measure device that can sample at a rate of up to approximately 40 Hz and operates on conventional AA batteries for up to approximately two hours of continuous sampling, with longer operating times made possible by larger batteries.

A tenth objective of the present invention is to provide methods, systems and devices for wireless radar measurement and sensing device that can measure beach run-up, free surface elevation in tidal zones and storm surge elevations near bridges and or other critical infrastructure during storm events.

An eleventh objective of the present invention is to provide methods, systems and devices for a radar gauging technique employs a DC-coupled architecture that allows accurate measurement of the slow-varying water level and is immune from the interference of multipath echoes.

An embodiment of a wireless radar sensor for measuring water surface level and characteristics in time can include a CW (continuous wave) Doppler radar coupled with a transit antenna and a receive antenna to transit a continuous wave wireless signal to a moving target and wirelessly receive a reflected signal, a signal processing circuit to process the received reflected signal to generate a digital data corresponding to a water level measurement, a power source for supplying power to the DC (direct current) coupled radar, and a micro-controller coupled with a cellular antenna to wirelessly transmit the digital data to a base station to measure wave and water level to detect water elevation changes.

The continuous wave Doppler radar can include a waveform generator to produce a continuous microwave signal to transmit, a mixer for mixing the original transmitted signal with a received reflected signal, and an analog-to-digital converter to convert the mixed signal to a digital data.

The wireless radar sensor can further include at least one of a course tuning and a fine tuning circuit.

The waveform generator can include a linear oscillator to generate a 2.4 GHz continuous wave signal.

The transmit antenna and the receive antenna can be patch antennas, and the power source can be a battery. The power source can also be a solar power source, and a rechargeable battery for storing excess solar energy.

The base station can be selected from a group consisting of a personal computer, a tablet or a personal data assistant device.

The continuous wave Doppler radar can be a DC-coupled continuous wave Doppler radar. The continuous wave Doppler radar can be an AC-coupled continuous wave Doppler radar.

The signal processing can include arctangent demodulation.

The wireless radar sensor can include a multiple radar configuration, of one radar, a two radar configuration, and a four radar configuration.

A wireless radar sensing system embodiment for storm surge tracking and tidal zone assessment can include two or more wireless radar sensors in communication. Each wireless radar sensor can include a signal generator to generate a microwave signal, a transmitting antenna to transmit the generated signal, a receive antenna to receive a reflected signal, a mixer for combining the generated signal with the received signal, a converter to convert the mixed analog signal to a digital data, and a radio and antenna for transmitting the digital data.

A method for wave and water level measurement can include the steps of generating a continuous wave signal and transmitting the continuous wave signal toward a moving target, receiving a reflected signal from the moving target, mixing the generated signal and received signal, down converting the mixed signal to a baseband signal, converting the baseband signal to a digital data, and transmitting the digital data to a local personal computing device or a base station.

The wave and water level measurement method can include the step of sampling at a rate of approximately 40 Hz. The generating step can include the step of generating an approximately 2.4 GHz continuous microwave signal.

Further objects and advantages of this invention will be apparent from the following detailed description of preferred embodiments which are illustrated schematically in the accompanying drawings.

DESCRIPTION OF THE PREFERRED EMBODIMENTS

Figure 1:
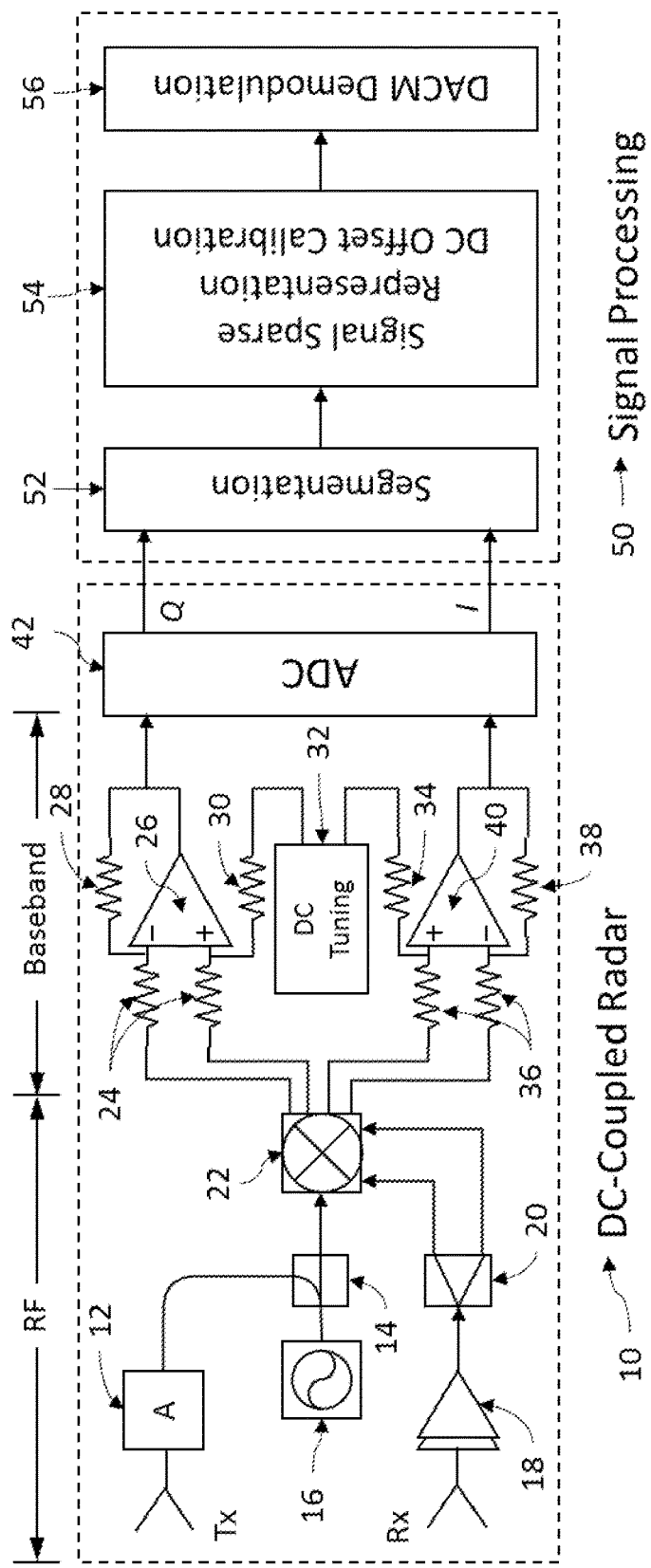
FIG. 1 is a block diagram of a radar device for large-scale displacement tracking.

Before explaining the disclosed embodiments of the present invention in detail it is to be understood that the invention is not limited in its applications to the details of the particular arrangements shown since the invention is capable of other embodiments. Also, the terminology used herein is for the purpose of description and not of limitation.

In the Summary above and in the Detailed Description of Preferred Embodiments and in the accompanying drawings, reference is made to particular features (including method steps) of the invention. It is to be understood that the disclosure of the invention in this specification does not include all possible combinations of such particular features. For example, where a particular feature is disclosed in the context of a particular aspect or embodiment of the invention, that feature can also be used, to the extent possible, in combination with and/or in the context of other particular aspects and embodiments of the invention, and in the invention generally.

In this section, some embodiments of the invention will be described more fully with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will convey the scope of the invention to those skilled in the art. Like numbers refer to like elements throughout, and prime notation is used to indicate similar elements in alternative embodiments.

A list of components will now be described.
1 radar device for large scale displacement-tracking.
10 DC Coupled Radar section.
12 A refers to a gain block, such as a n RFMD SG.
14 refers to a power divider, such as a Wilkinson power divider.
16 refers to a voltage controlled oscillator, such as a HMC385 voltage controlled oscillator.
18 refers to a low noise amplifier, such as a HMC286 low noise amplifier.
20 refers to a single-to-differential balun such as a Murata 2.4 GHz 50 Ohm balun.
22 refers to a quadrature mixer, such as a Skyworks 73012 mixer.
24 refers to a resistor, such as a surface-mount resistor in 0603 package.
26 refers to an operational amplifier, such as a MAX44246 amplifier.
28 refers to a resistor, such as a surface-mount resistor in 0603 package.
30 refers to a resistor, such as a surface-mount resistor in 0603 package.
32 refers to a DC Tuning block, such as a circuit based on MSP430 and some peripheral resistor and capacitor components.
34 refers to a resistor such as a surface-mount resistor in 0603 package.
36 refers to a resistor such as a surface-mount resistor in 0603 package.
38 refers to a resistor, such as a surface-mount resistor in 0603 package.
40 refers to an operational amplifier, such as a MAX44246 amplifier.
42 refers to an ADC, analog to digital converter, such as the ADC in MSP430 microcontroller.
50 Signal Processing section.
52 Segmentation, refers to a segmentation algorithm, which will be described in "Step 1" of the "Theory" part.
54 Signal Sparse Representation DC Offset Calibration refers to the DC offset calibration algorithm, which will be described in "Step 2" of the "Theory" part.
56 DACM Demodulation refers to an extended differentiate and cross-multiply algorithm, which will be described in "Step 3" of the "Theory" part.

The interferometric Doppler radar and method for wave and water level measurement of the present invention can be a single DC (direct current)-coupled continuous wave Doppler radar device 1, shown in FIG. 1 that is capable of detecting water elevation changes in time when installed up to several meters from the water surface. The radar device is wireless and can stream continuous data to a local PC (personal computer) or base station in range of its radio. The radar device 1 can sample up to approximately 40 Hz and can run on four AA batteries for up to two hours with continuous sampling. Applications for this radar include the measurement of beach run-up, free surface elevation in tidal zones, and storm surge elevations near bridges and critical infrastructure during storm events.

FIG. 1 is a block diagram of a radar device 1, for large-scale displacement tracking. Referring to FIG. 1, Tx and Rx are the transmit and receive antennas, respectively. DC-coupled radar 10 sends radio frequency signal through the Tx antenna and receives the reflected signal using the Rx antenna, and then down-converts the received signal to baseband using the mixer 22. Radio frequency gain block 12 amplifies the signal generated by 16, the voltage-controlled oscillator. Power divider 14 splits the signal generated by the voltage-controlled oscillator into two paths, with one going to the gain block 12 and the other one going to the mixer 22. Voltage controlled oscillator 16 generates the radio frequency signal for the radar.

Low noise amplifier 18 amplifies the signal received by the Rx antenna. Single-to-differential balun 20 converts the single-ended signal from the low noise amplifier 18 to differential signals. Quadrature mixer 22 down-converts the radar received signal (coming from the Rx antenna) to baseband, using a copy of the transmit signal (from 14) as a reference. Resistors 24, 28, 30, 34, 36 and 38 are used to convert an operational amplifier into a fixed-gain amplifier.

Operational amplifiers 26 and 40 amplify the baseband signal from the mixer 22 output. DC tuning block 32 controls the bias voltage of the feedback amplifier.

Analog-to-digital converter 42 converts the analog baseband signal into digital and feed it into the signal processing unit 50, which is the signal processing part realized in software.

Segmentation unit 52 in the signal processing part will be described in details in "Step 1" of the "Theory" part. Signal sparse representation 54 and DC-offset calibration unit will be described in details in "Step 2" of the "Theory" part. DACM (differentiate and cross-multiply) algorithm modulation unit 56 is used for signal processing will be described in details in "Step 3" of the "Theory" part.

Referring to FIG. 1, the radar device 1 can include a two patch antennae, with one transmitter Tx and one receiver Rx. Each of the antennae can have a beamwidth of approximately 45 degrees. An approximately 2.4 GHz continuous microwave signal is transmitted to a moving target surface (i.e. water) through Tx and the reflected signal is modulated by the relative motion between target surface and the radar. The received reflected signal is captured by Rx and combined with the original transmitted signal in the radar's analog front end 10.

The combined signal is down converted by 22 to its baseband signals. The baseband signals are digitized on the embedded microprocessor 42 and transmitted wirelessly to the base station. The relative motion time history is extracted from the baseband signals through a series of signal processing approaches that include segmentation 52.

DC offset calibration 54, and DACM demodulation 56. Prior to data collection, coarse- and fine-tuning 32 are implemented to ensure the measured signals are in the range of the analog-to-digital converter 42 of the microprocessor while still retaining the DC component of the measured signal, thereby allowing slow moving processes to be captured. The patch antennae Tx and Rx are rectangular patches mounted on a rectangular substrate layer between the patch and the ground plane. Since antenna size is a function of frequency/wavelength, the lower the frequency the lower the power but larger the antenna. The antenna directivity is determined by the relative size of the patch to the substrate. In the example shown, the 3-dB beamwidth of the radar system is estimated at approximately forty-five degrees (45°).

Experimental Results:

An experimental radar level measuring device 1 was used to perform a beach run-up test. The goal of the test was to assess the ability of the radar device to capture water run-up levels. In the experiment, the radar was placed approximately one meter above the sand, with the antenna parallel to the sand/water surface. Samples were taken at a rate of approximately 40 Hz (40 samples per second). The experimental beach run-up level test captured characteristic water level patterns at amplitudes consistent with manual measurements and or observations. The initial beach run-up short duration test results are shown in FIGS. 2A and 2B and longer duration test results are shown in FIG. 3A.

Figure 2B:
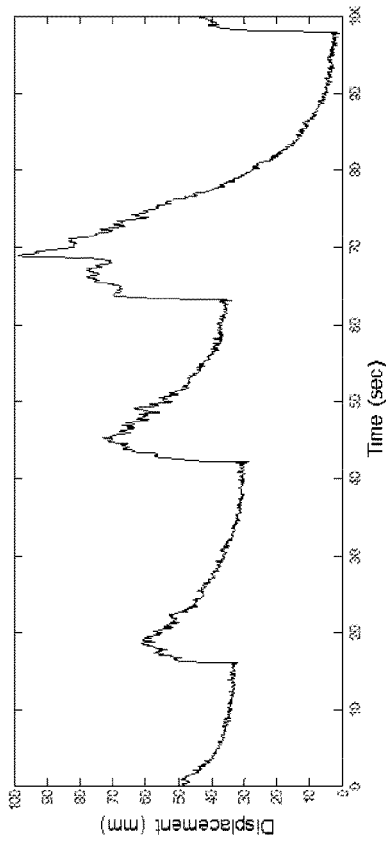
FIG. 2B is a second graph of the results of an initial short duration test.
Figure 2A:
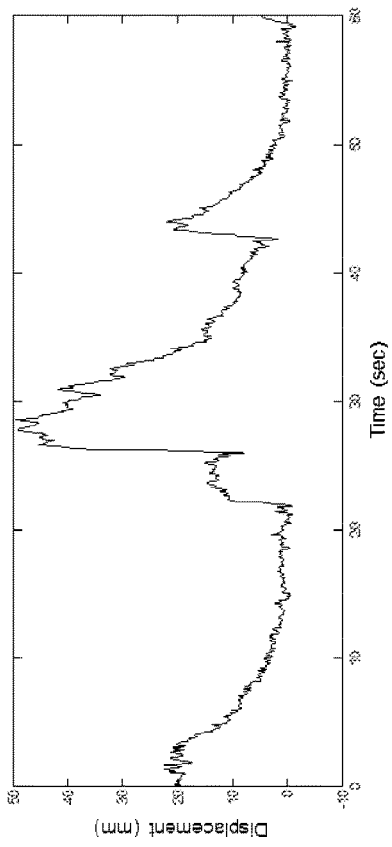
FIG. 2A is a first graph of the results of an initial short duration test.

FIGS. 2A and 2B demonstrate the ability of measuring device 1 to capture beach run-up data, clearly showing the characteristic water level patterns of beach run-up. FIG. 2A shows run-up data in the 0-50 mm range, while FIG. 2B shows similar data with a higher amplitude (up to 100 mm run-up water level).

Figure 3:
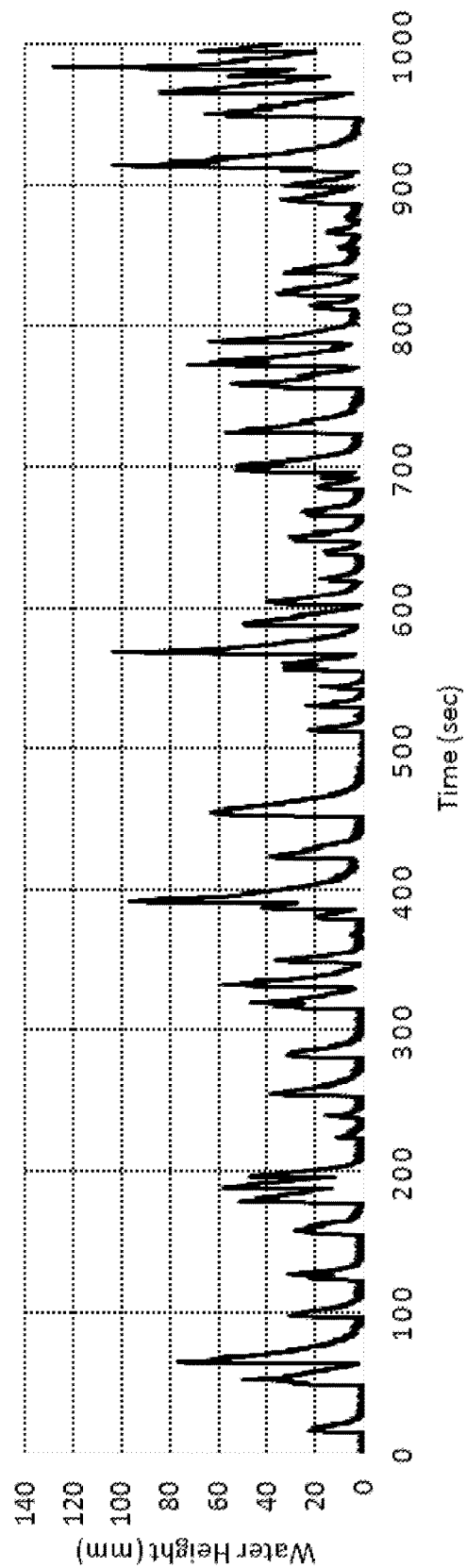
FIG. 3 is a graph showing results of a longer duration test.

FIG. 3A shows the results of a longer-duration beach run-up test, demonstrating that the radar is capable of continuously capturing run-up measurements up to 1000 seconds without signal drift.

Figure 4A:
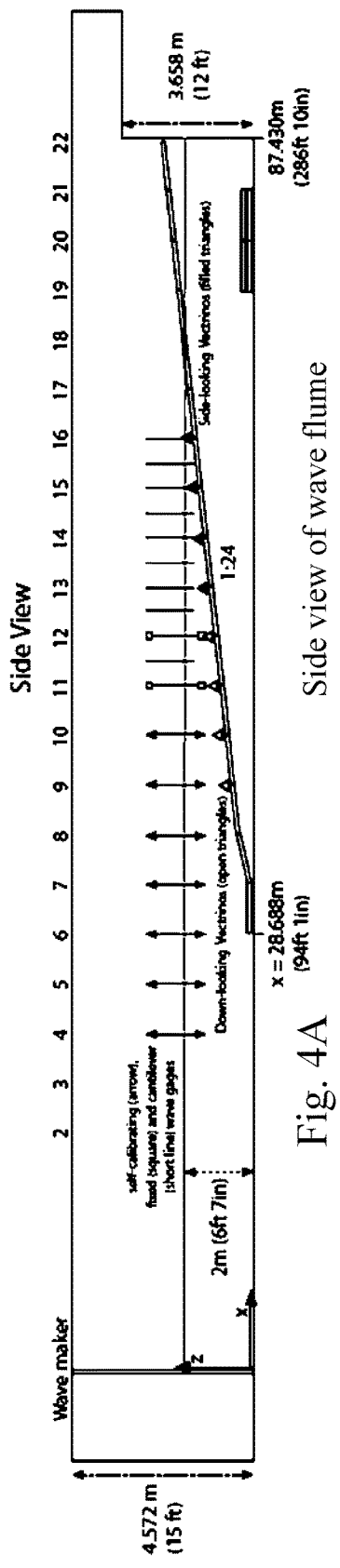
FIG. 4A is a side view of a test setup at the OH Hinsdale Wave Research Laboratory.
Figure 4B:
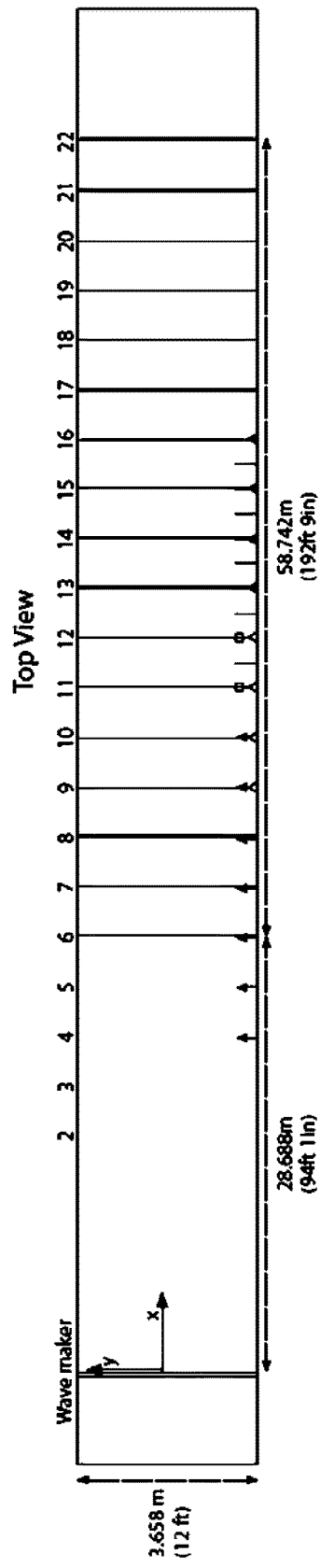
FIG. 4B is a top view of a test setup shown in FIG. 4A.

Another experiment was conducted at Oregon State University to access the radar performance for measuring waves in a controlled environment and then compare the results to reference sensor results. FIG. 4A is a side view and FIG. 4B is a top view of the test set-up at the large wave fume facility at the OH Hinsdale Wave Research Laboratory at Oregon State University. The test set-up placed the radar at a height of approximately 2.0 meter above the water at a distance of approximately 1.33 meter from the flume wall, centered over the flume as shown in FIG. 4A and FIG. 4B. The wave generation for the test was a succession of solitary waves with a wave height of 10 cm and 20 cm. Three waves were generated per test. The results of the 10 cm solitary wave measurement are show in FIG. 5A, and the 20 cm solitary wave measurements are shown in FIG. 5B.

Figure 5A:
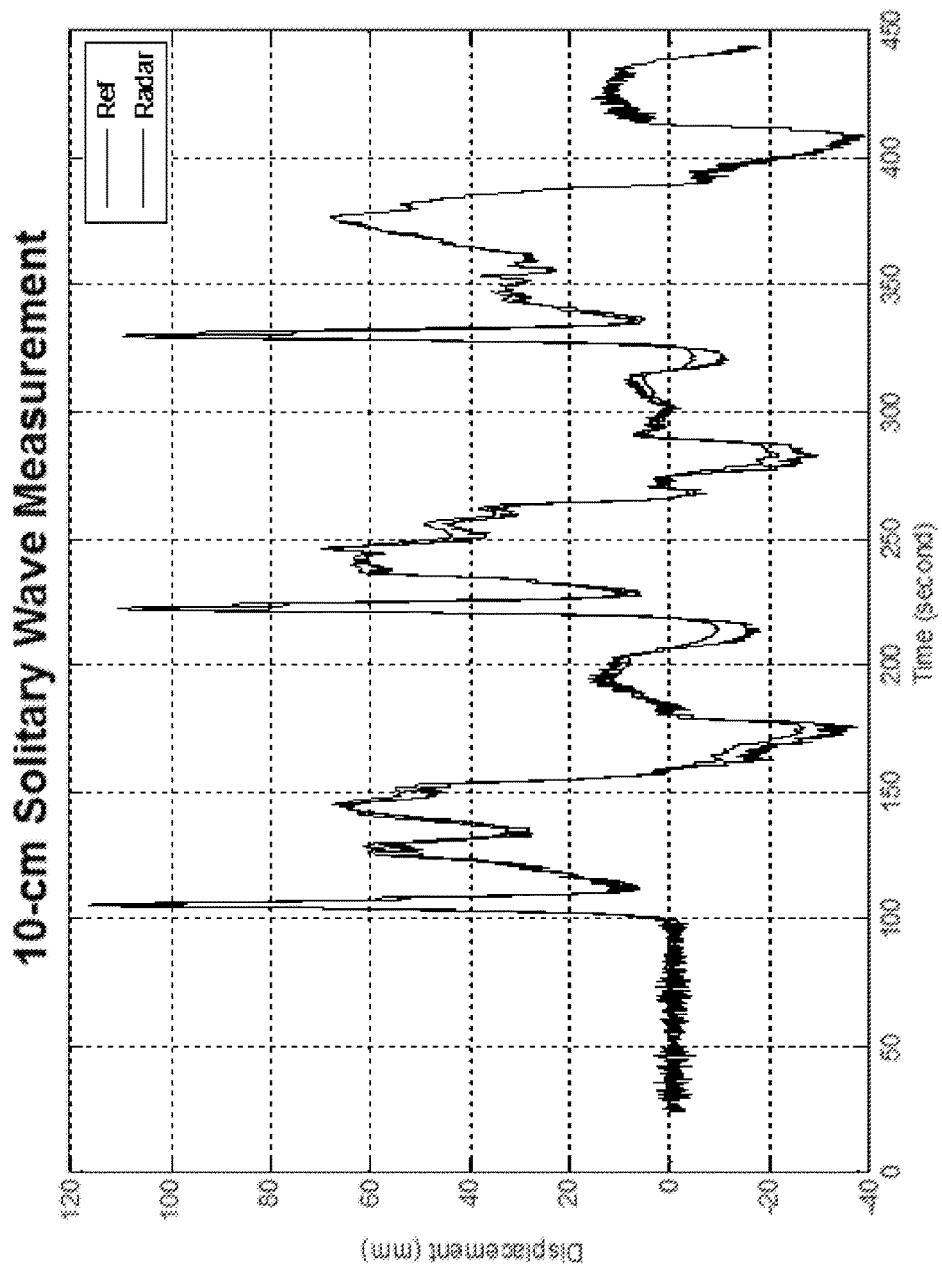
FIG. 5A is a graph showing the results for a 10-cm solitary wave measurement.
Figure 5B:
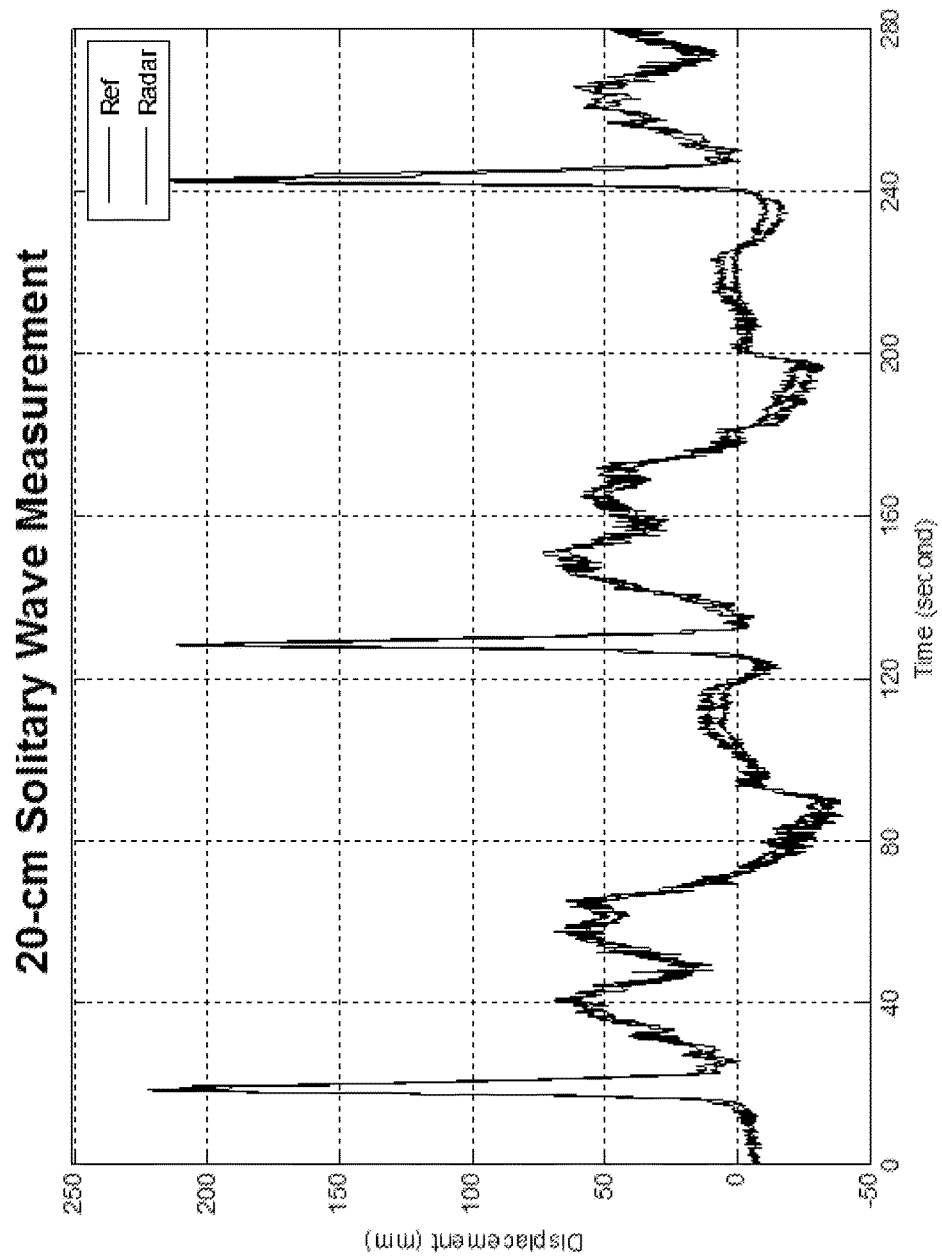
FIG. 5B is a graph showing the results for a 20-cm solitary wave measurement.

The data in FIGS. 5A and 5B demonstrate that the radar is capable of accurately measuring wave heights over open water with an amplitude of up to approximately 20 cm. The accuracy is confirmed by the close comparison of the radar measurement to a reference sensor (a calibrated resistive wave gage installed in the wave flume).

In an embodiment, the wireless radar devices are configured in an array to enable the measurement and assessment of the spatial variability in tidal zones and run-up regions. The ability of the radars to communicate with one another also enables collaborative measurements that can improve the data quality generated by the network over that generated by a single sensor. The novel aspects of this sensor are that it is small (smaller than a tissue box), low power, and wireless, while operating with sampling rates up to 40 Hz. The device of the present invention is much lower cost than other water level detection devices currently available on the market. The embedded microprocessor enables data processing at the sensor location and coordinated sensing within a network of sensors. It uses a noncontact measurement approach, thereby eliminating interference with the phenomenon being measured.

The result of this invention will be a wireless, low-cost radar sensor for measuring water surface elevation and characteristics (wave heights/shapes) in time. The fully integrated unit can be used as a single device or in a network of devices for applications including, beach run-up measurements, storm surge tracking, and tidal zone assessment.

Theory:

The radar baseband I/Q outputs are digitized by a data acquisition card and they are:

$$B_I[n] = A(n) \cdot \cos\left[\frac{4\pi x(n)}{\lambda} + \Delta\varphi\right] + DC_I(n), n = 1, 2, 3 \ldots \quad (1)$$

$$B_Q[n] = A(n) \cdot \sin\left[\frac{4\pi x(n)}{\lambda} + \Delta\varphi\right] + DC_Q(n), n = 1, 2, 3 \ldots \quad (2)$$

where x(n) is the varying water level, $\lambda$ is the wavelength of the carrier signal, $\Delta f$ is the residual phase, A(n) is the amplitude of the measured signal, and $DC_I(n)/DC_Q(n)$ are the DC offset of the I/Q channels. Since the water level variation is so large that it is not negligible compared to the distance between the water level and the radar, the radar-measured signals would have distance-dependent amplitude modulation and time-varying dc offset, which makes it challenging to calibrate the radar signals. In this case, the conventional arctangent demodulation with prefixed dc offset calibration would not be suitable. To precisely measure large displacement of water level, a novel signal processing approach has been proposed, as shown in FIG. 2. There are three steps in the signal processing flow: 1) signal segmentation, 2) DC calibration, and 3) phase demodulation.

Step 1: The measured signals are divided into a sequence of fixed-length window cells whose length is much smaller than the signal period. Therefore, the amplitude change within one window cell is minimal. It is assumed that the amplitude within the window cell is stable and DC offset values will not change as well. The DC offset calibration and phase demodulation will be performed in Step 2 and Step 3, respectively. This process continues until the end of the segments. The overall water level information is reconstructed by combining the displacement recovered in phase demodulation from each segment.

Step 2: From (1) and (2), it is seen that each I/Q measurement, $<B_I[i], B_Q[i]>$, will sit on a circle centered at $(DC_I, DC_Q)$ with a radius of A. Therefore, the DC offset calibration problem can be formulated as follows: given a set of I/Q quadrature signals with n samples: $<B_I(1:n), B_Q(1:n)>=\{(I_1,Q_1), (I_2, Q_2) \ldots (I_n, Q_n)\}$ there is a tuple $(DC_I, DC_Q, A)$ such as $$\min\|d\|_2 \quad (3)$$

$$d=[d_1,d_2 \ldots d_i \ldots d_n],$$

$$d_i=(I_i-DC_I)^2+(Q_i-DC_Q)^2-A^2 \quad (4)$$

where $d_i$ is the fitting residual between the measurement $(I_i, Q_i)$ and the circle $(DC_I, DC_Q, A)$. Therefore, according to (3) and (4), the DC offset calibration is formulated into a least square (LS) optimization problem, i.e. norm-2 ($l_2$) minimization. The LS method will try to minimize the root mean square error (RMS) out of all measurements regardless of considering measurement errors. These outliers will affect the accuracy of the DC offset estimation. In this part, a new heuristic is proposed to reduce the number of measurements far away from the fitting circle. It pushes every residual item to zero and minimizes the number of non-zero items. Note that the value of non-zero items can be large, and it is different from RMS error minimization. This heuristic is called sparsity pursuit and can be formulated with the norm-0 ($l_0$) of d:

$$\min \|d\|_0 \quad (5)$$

is the norm-0 ($l_0$) minimization problem and belongs to intractable NP-hard problems. However, it is proved that the solution in (5) is the same as the solution in norm-1 ($l_1$) with very high probability, which is a linear programming problem. The final form of dc offset calibration can be presented as $$\min \|d\|_1 \quad (6)$$

It is seen that (6) is a well-posed problem and can be solved efficiently. Specifically, the solution of (6) is to obtain the sparsest representation of fallacious measurements.

Step 3: In arctangent demodulation, the phase discontinuity happens when the demodulation exceeds the native range of ($-\pi/2, \pi/2$). Although it could be eliminated theoretically by shifting the discontinuous points by an integer multiple of $\pi$, it is actually difficult for a hardware to automatically make a judicious choice on where to compensate the phase, especially in real-time applications where segmentation window may change the length to accommodate the pumping/draining speed. An extended differentiate and cross-multiply (DACM) algorithm is employed for automatic phase unwrapping for phase reconstruction without ambiguities $$\varphi(t) = \arctan[Q(t)/I(t)] \quad (7)$$

where I (t)/Q(t) are I/Q signals after calibration. With a further accumulation, the phase information φ[n] is reconstructed $$\phi[n] = \sum_{k=2}^{n} \frac{I[k]\{Q[k] - Q[k-1]\} - Q[k]\{I[k] - I[k-1]\}}{I[k]^2 + Q[k]^2} \quad (10)$$

Instead of involving any phase unwrapping procedures, the DACM based phase demodulation technique allows the water level information to be directly retrieved from the calibrated I/Q signals without any ambiguity.

Referring again to FIG. 1, the DC-coupled radar sensor has been integrated with the signal processing approach and it can work in a wide carrier frequency range from 300 MHz to 4 GHz, which helps suppress the unwanted measurement of water ripples by properly choosing the carrier frequency.

Figure 6:
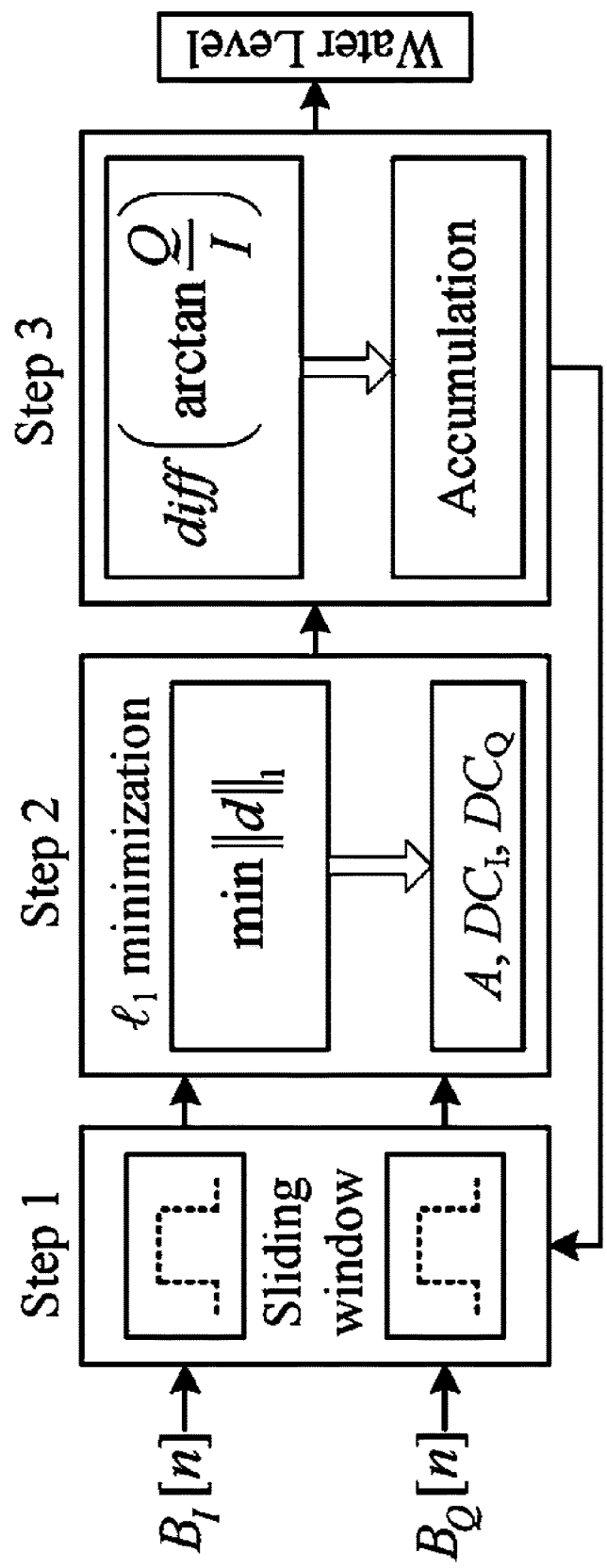
FIG. 6 is a flow chart of the signal processing for water level gauging.

FIG. 6 is a flow chart of the signal processing for water level gauging. FIG. 6 is a more detailed plot of the "Signal Processing 50" component in FIG. 1. Once the digitized baseband signal is fed into the signal processing unit 50, it is first segmented by the Segmentation unit 52 based on the method described in "Step 1" of the "Theory" part. Then, the segmented signal is fed into the DC offset calibration unit 54 for DC offset calibration based on a signal sparse representation method. Details of the DC offset calibration procedure is described in "Step 2" of the "Theory" part. After that, the baseband signal is fed into the DACM Demodulation unit 56 to recover the water level information. Detailed procedure of DACM demodulation is described in "Step 3" of the "Theory" part.

Figure 7:
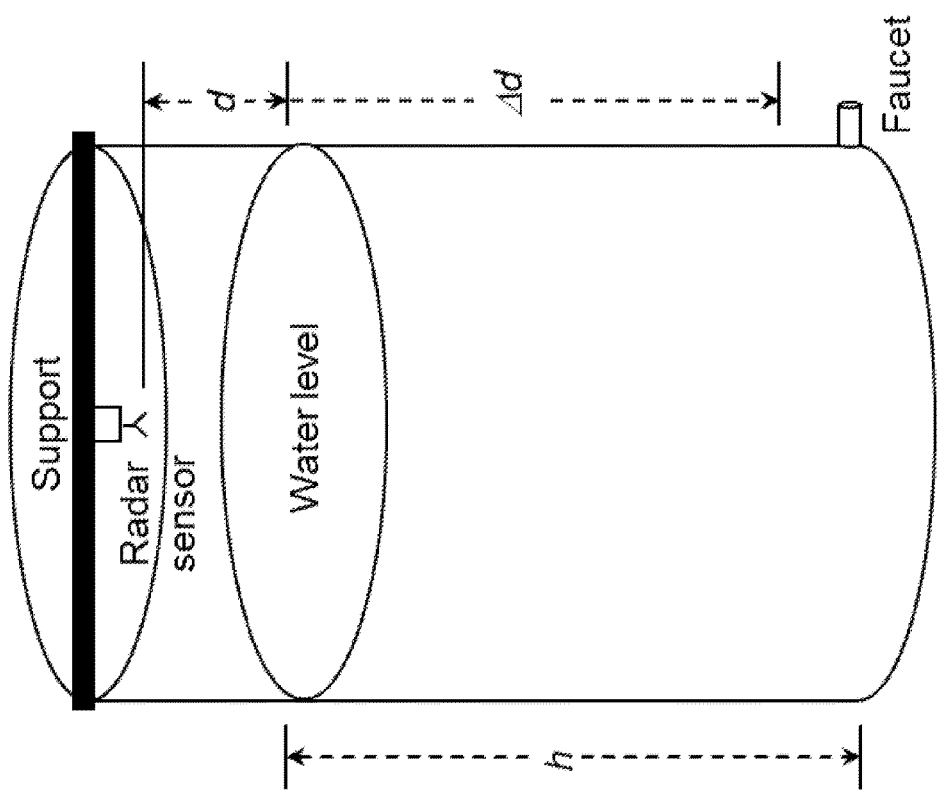
FIG. 7 shows an experimental setup of radar sensor measuring the water level in a rain barrel in an outdoor environment.

FIG. 7 shows an experimental setup of the invention. The inset shows the designed DC-coupled radar sensor. A rain barrel was filled with water with a depth of h=75 cm. The designed radar sensor was placed over the rain barrel, facing the water surface at a distance of d=25 cm. The radar sensor was configured to work at 2.4 GHz and measured the water level when the water drained out slowly (water level dropped a relative distance of Δd). The initial position of the water level was marked on the rain barrel and the end position was also recorded so as to provide a reference for the water level drop.

Figure 8:
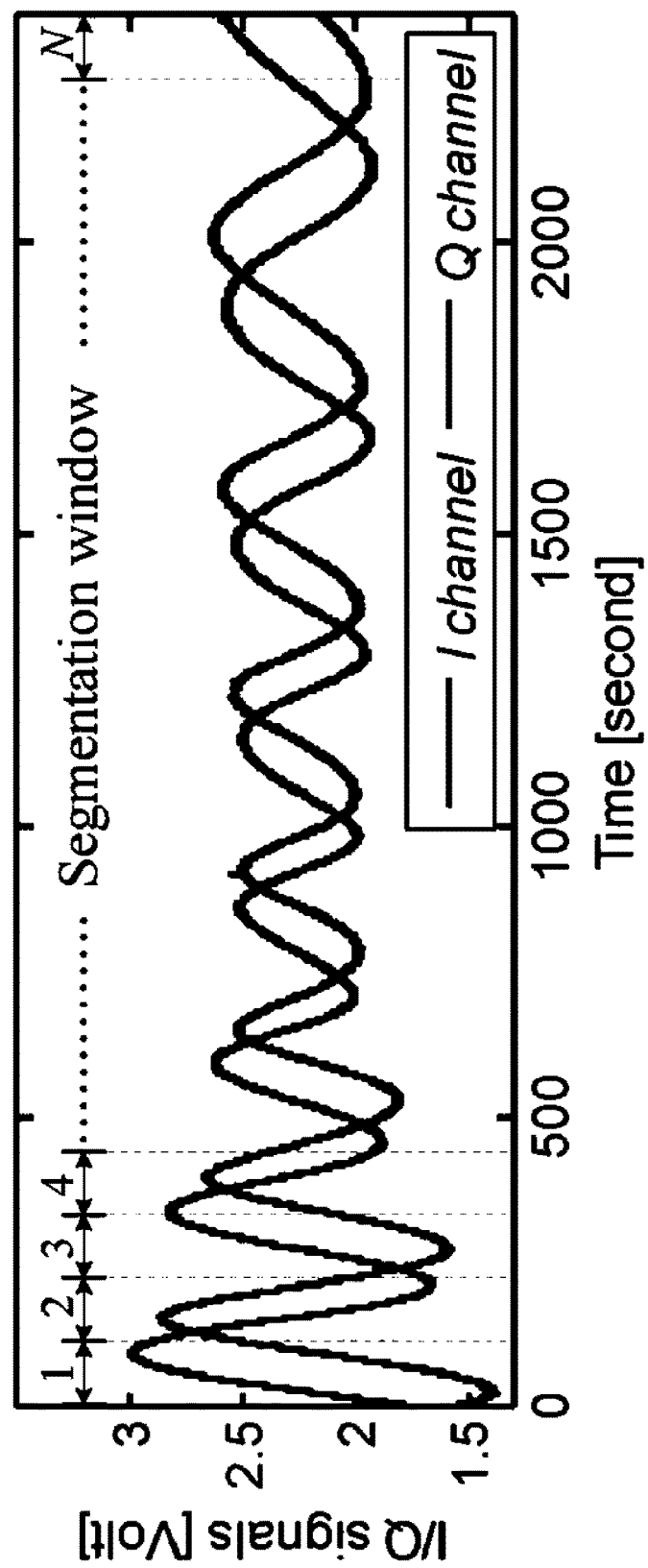
FIG. 8 shows radar measured time-domain I/Q signals with varying amplitudes.

The radar measured water level signals are shown in FIG. 8. It is seen that the measured signals are periodic but have varying amplitude. These varying amplitudes are because the water level drops as time elapses. The received signal is amplitude-modulated due to this detection distance change. It shows stronger signals at the end of the time, due to the stronger reflections from the bottom of the barrel as the water level drops. However, the stronger time domain signals do not affect the measurement accuracy because the water level information is modulated in the phase.

FIG. 8 shows the importance of the data segmentation unit 52 in FIG. 1. Without proper segmentation, each signal processing window will contain signal with varying amplitude, which will make practical DC offset calibration and DACM demodulation difficult.

Figures 9A, 9B:
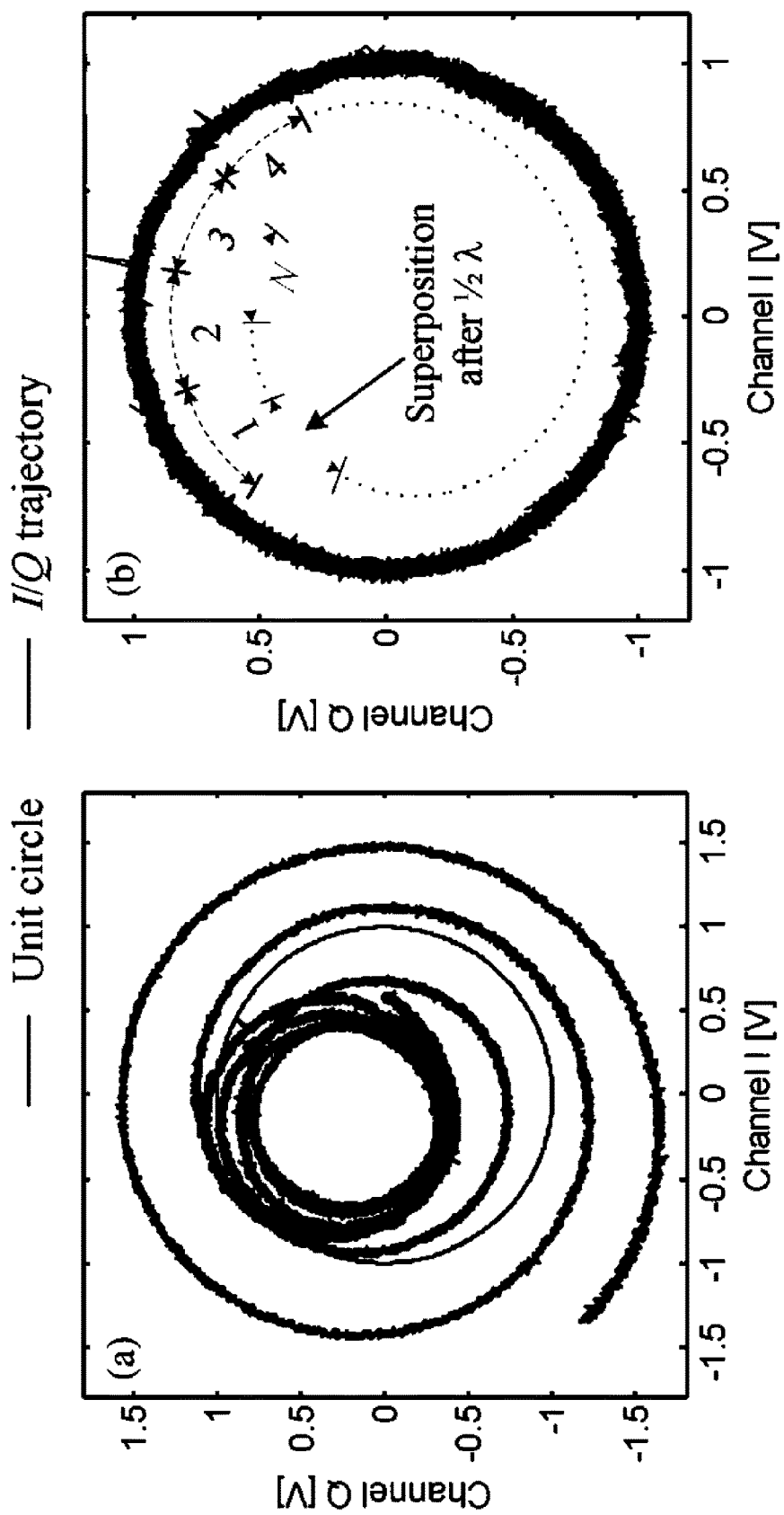
FIG. 9A shows the trajectories of I/Q original signals with prefixed DC compensation.
FIG. 9B shows the trajectories of I/Q signals after signal segmentation and DC calibration based on SSR.

The trajectory of the original I/Q signals with pre-fixed dc compensation is illustrated in FIG. 9A, which shows an irregular helical shape. In contrary, FIG. 9B shows the I/Q trajectory using the proposed signal processing approach. It is seen that it fits the unit circle well. Each segment forms a short arch on the unit circle, and all the arches are connected to form a full unit circle. It is noted that the arch superposition happens after the water level drops over a half wavelength of the radar carrier, because the phase modulation exceeds 360°.

FIGS. 9A and 9B confirm the importance of the data segmentation unit 52 and the DC offset calibration unit 54 in FIG. 1. Without proper data segmentation followed by DC calibration, the signal trajectory will have varying radius (as demonstrated by FIG. 9A), which will make it very difficult to carry out DACM demodulation and recover the water level information.

Figure 10:
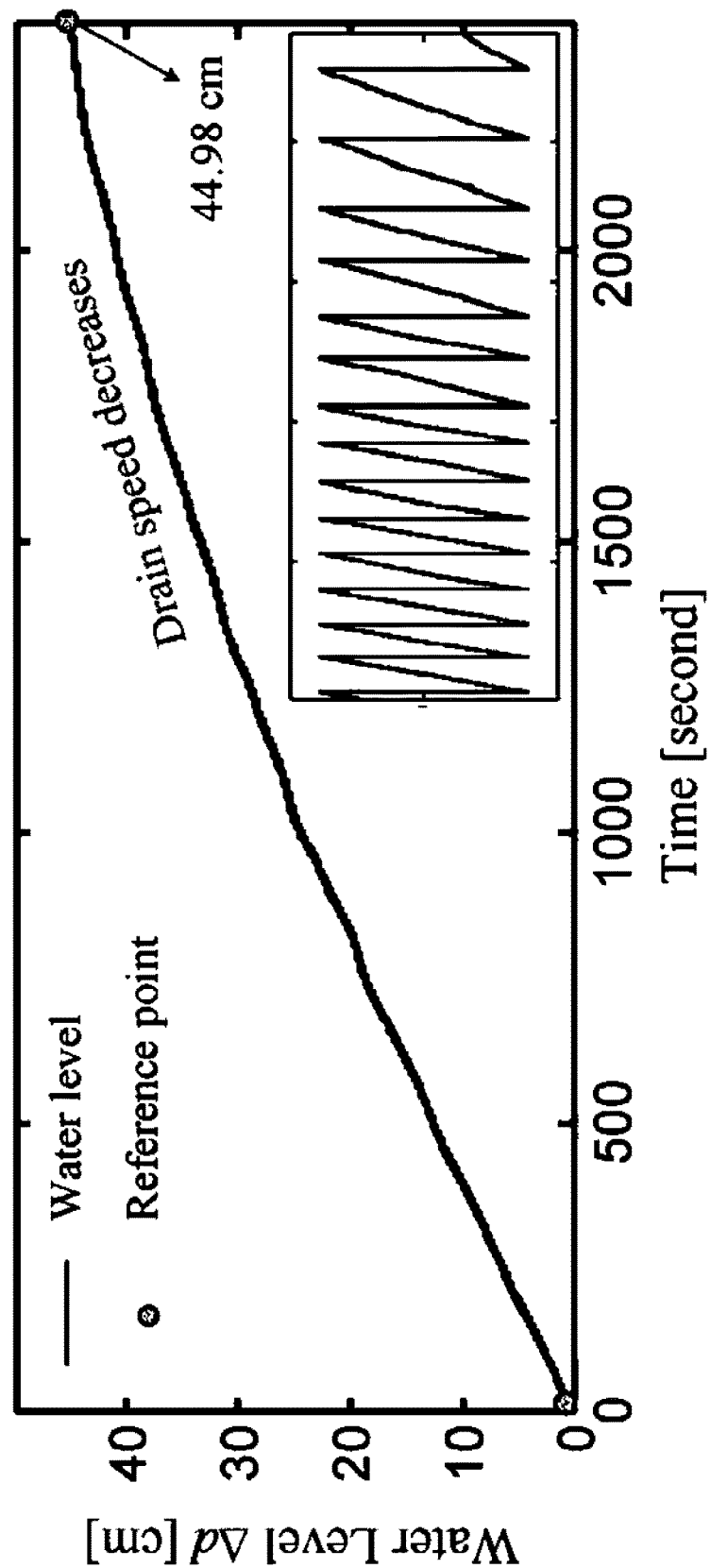
FIG. 10 shows radar measured water level with an inset showing the demodulated water level signal using the conventional arctangent demodulation.

The water level information demodulated by the proposed signal processing approach is shown in FIG. 10. It is seen that the phase information has been reconstructed well without any phase ambiguity, while the arctangent demodulation leads to phase discontinuity, as shown in the inset of FIG. 10. It is also seen that the slope of the water level decreases as time elapses, because the water pressure at the faucet decreases as the water level drops, which leads to slower drawdown speed.

The radar measured water level variance is 44.98 cm and the reference level drop is 45 cm. Measurements were also performed for different water levels when water was pumped in or drained out.

FIG. 10 and inset demonstrates the end result of water level monitoring. It verifies that the water level measured by the invention matches with the reference measurement, which is represented by the "Reference point" in the graph.

The inset of FIG. 10 demonstrate the advantage of DACM demodulation. If the conventional arctangent demodulation, instead of the DACM demodulation, were used, then the water level monitoring result will be represented by the curve in the inset, which is incorrect due to the phase wrapping problem of arctangent demodulation. On the other hand, the DACM demodulation algorithm can properly handle phase unwrapping and get the correct water level information.

TABLE 1

| No. | Meas. [mm] | Ref. [mm] | Err. [mm] |
| --- | --- | --- | --- |
| 1 | 449.8 | 450.0 | 0.2 |
| 2 | 373.6 | 372.5 | 1.1 |
| 3 | 420.3 | 421.0 | 0.7 |
| 4 | 256.3 | 255.0 | 1.3 |
| 5 | 345.9 | 346.5 | 0.6 |
| 6 | 224.5 | 226.0 | 1.5 |
| 7 | 459.9 | 460.5 | 0.6 |
| 8 | 403.5 | 402.5 | 1.0 |
| 9 | 353.8 | 355.0 | 1.2 |
| 10 | 320.4 | 320.0 | 0.4 |

TABLE 1 shows the data summary, which indicates mm accuracy. In order to detect absolute distance from radar to water surface, calibration needs to be done before the measurement.

The data summary results in TABLE 1 confirms the reliable and correct water level measurement based on the invented radar technology. Water was drained out and pumped in the barrel multiple times at different levels. The results measured by the invention match well with the reference values.

Figure 11:
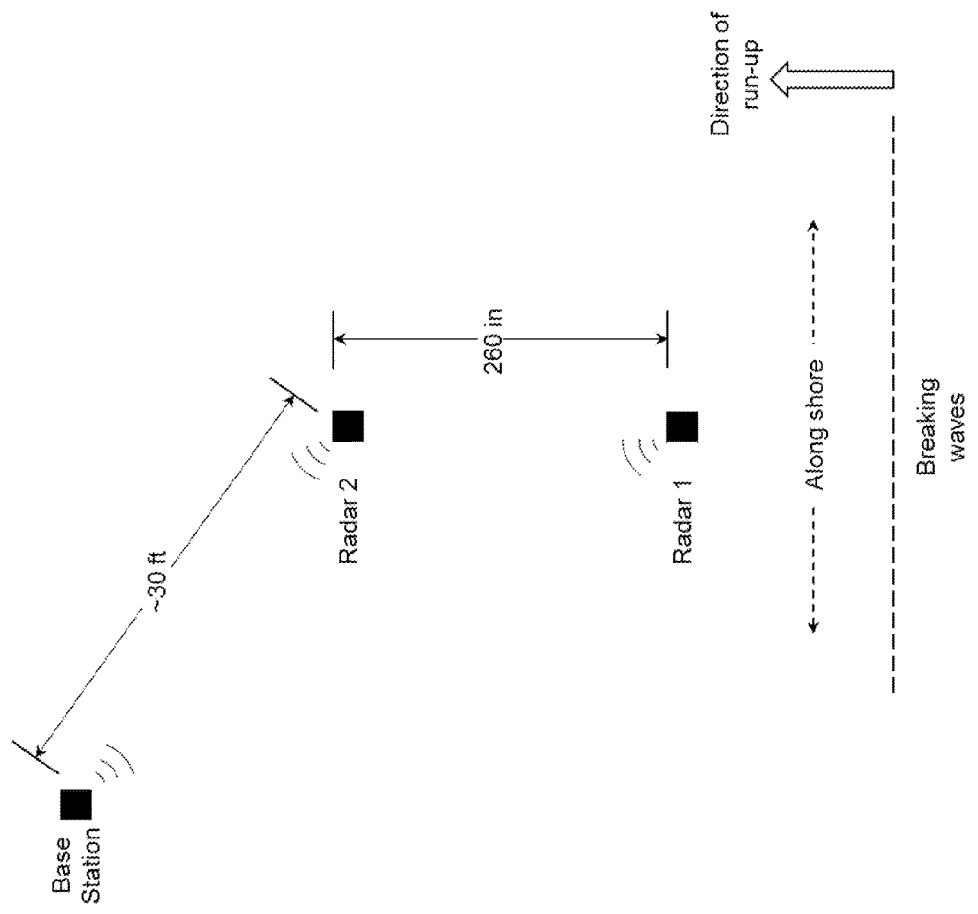
FIG. 11 shows a plan view of a multiple radar beach run-up test setup with the invention.

FIG. 11 shows a plan view of a multiple radar beach run-up test setup. In FIG. 11, Radar 1 is closest to the breaking waves, while Radar 2 is 260 inches further inland relative to Radar 1. The radars are mounted approximately 45 inches above the sand on tripods and are pointed directly downward to capture any run-up as the waves break. The base station is located approximately 30 feet away from Radar 2. As the radars collect data simultaneously, they stream it to the base station, using 2.4 GHz radios, for viewing and archiving.

Figure 12:
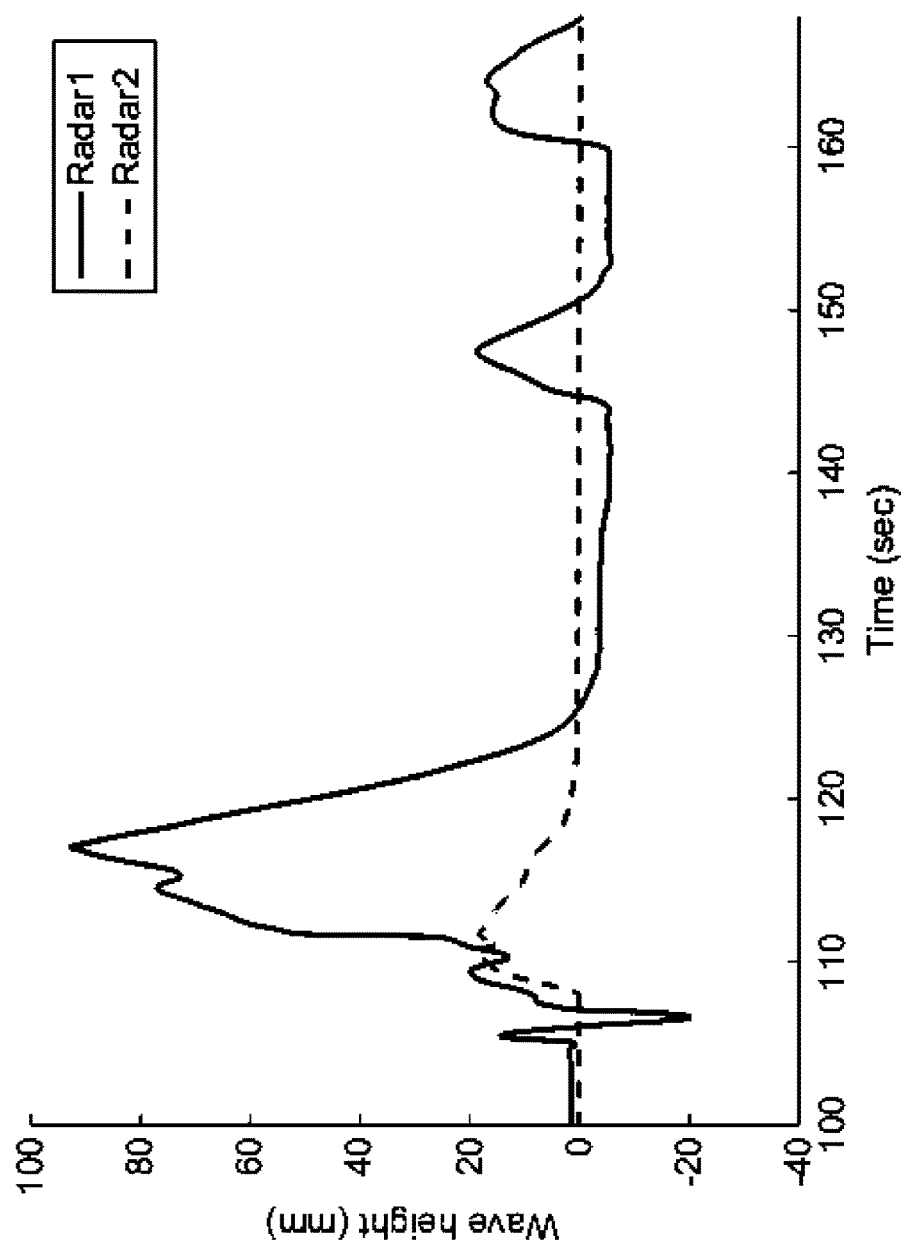
FIG. 12 is a graph of the multiple radar beach run up test results for the setup of FIG. 11.

FIG. 12 is a graph of the multiple radar beach run up test results for the setup of FIG. 11. In FIG. 12 the signal that is measured by radar 1 has higher amplitude and more variation than the signal measured by radar 1. The reason for this difference is that radar 1 is closer to the breaking waves than radar 2. Some of the run-up that is measured by radar 1 does not make it to the location measured by radar 2. If the run-up does make it to radar 2, it is at a lower water depth due to the longer travel distance.

Figure 13:
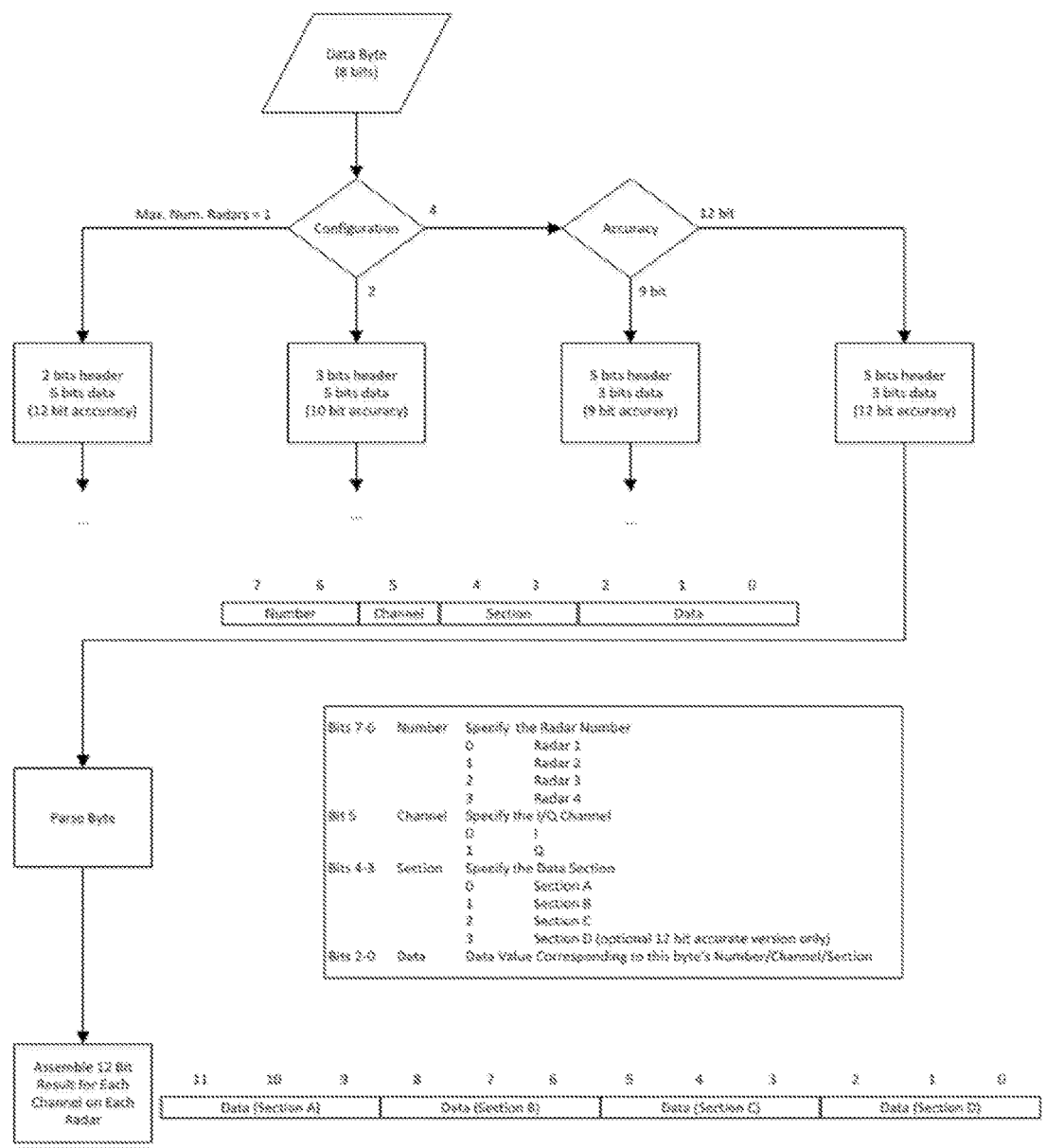
FIG. 13 is a multiple radar data communication flowchart for one, two or four radars.

FIG. 13 is a multiple radar data communication flowchart for one, two or four radars. Observations of I and Q recorded by the radar are transmitted byte-by-byte to a receiver. The 8 bits of each byte transmitted are split into a header component and a data component. For a given data byte, the header represents which radar is being used as well as whether the data component is for an I or a Q signal. Since the number of bits available for the data component is much less than the accuracy of the ADC on the radar board, the radar splits this ADC value into several different sections and sends one at a time. Thus, the header also distinguishes which section of the data is being sent. Using this approach, the radar can be configured to support up to 1, up to 2, or up to 4 radars transmitting data simultaneously.

In the 1-radar configuration, only 2 bits are needed for the header. The header consists of 1 bit for I or Q and one bit for section 0 or 1. For example, for the transmission of a single 12-bit I signal value, two bytes would be sent. In the first byte, the data section would contain the first 6 bits of the signal while the second byte would contain the second 6 bits of the signal.

In the 2-radar configuration, one additional bit is added to the header to distinguish which radar is being used. As such, 1 bit is removed from the data section. Thus, when splitting and individual I or Q signal up, only 5 bits are available for the first section and 5 for the second, Again, only 2-bytes are transmitted for a given I or Q signal, thus resulting in an overall 110-bit accuracy of the signal.

For the 4-radar configuration, 2 bits are required to distinguish which radar is being used and 2-bits are used to distinguish which section. This leaves 3 bits available for data. In this configuration, for a given I or Q signal, the radar can be configured to send 3-bytes (supporting 3 sections for 9 bit accuracy) or 4-bytes (supporting 4 sections for 12 bit accuracy).

A flowchart describing this entire process for the 1-, 2- or 4-radar configurations, with an example of the actual bit assignments for the 4-radar configuration is shown in FIG. 13.

The present invention provides a Doppler radar technique for noncontact detection of large-scale displacement of a few carrier wavelengths. A novel signal processing approach has been designed to deal with the varying signal amplitude and dynamic dc offset to recover large phase variation. Experiments were carried out to validate that the proposed radar technique is able to gauge the water level with mm accuracy.

Applications for this radar can include the measurement of beach run-up, free surface elevation in tidal zones, and storm surge elevations near bridges and critical infrastructure during storm events.

Beach run-up can be measured by the radar by mounting it above the swash zone on a tripod pointed down toward the sand where the run-up occurs. Free surface water elevation can be measured by the radar if it is mounted on a structure (bridge, pier, platform, tower, etc) and directed toward the water surface. Free surface water elevation measurements may be used to track storm surge or flooding near bridges and other infrastructure.

The term "approximately" can be +/−10% of the amount referenced. Additionally, preferred amounts and ranges can include the amounts and ranges referenced without the prefix of being approximately.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. A wireless radar sensor for measuring water surface level and characteristics in time comprising:
   a CW (continuous wave) Doppler radar coupled with a transmit antenna and a receive antenna to transmit a continuous wave wireless signal without frequency modulation to a moving target of water and wirelessly receive a reflected signal having distance-dependent phase modulation;
   a signal processing circuit to process the received reflected signal to generate a digital data corresponding to a water level measurement for the moving target by utilizing differentiate and cross-multiply (DACM)

demodulation to recover water level information from phase information of the received reflected signal;

a power source for supplying power to the continuous wave Doppler radar; and a micro-controller coupled with a cellular antenna to wirelessly transmit the processed digital data to a base station to detect water elevation changes by measuring the water surface level of the moving target.

2. The wireless radar sensor of claim 1, wherein the continuous wave Doppler radar comprises:

a waveform generator to produce the continuous wave wireless signal to transmit without frequency modulation;

a mixer for mixing the original transmitted signal with the received reflected signal; and an analog-to-digital converter to convert the mixed signal to the digital data that is input to the signal processing circuit.

3. The wireless radar sensor of claim 1, further comprising:

at least one of a coarse tuning and a fine tuning circuit.

4. The wireless radar sensor of claim 2, wherein the waveform generator comprises:

a linear oscillator to generate a 2.4 GHz continuous wave signal.

5. The wireless radar sensor of claim 1, wherein the transmit antenna and the receive antenna are patch antennas.

6. The wireless radar sensor of claim 1, wherein the power source is a battery.

7. The wireless radar sensor of claim 1, wherein the power source comprises:

a solar power source; and a rechargeable battery for storing excess solar energy.

8. The wireless radar sensor of claim 1, wherein the base station is selected from a group consisting of a personal computer, a tablet or a personal data assistant device.

9. The wireless radar sensor of claim 1, wherein the continuous wave Doppler radar is a DC-coupled continuous wave Doppler radar.

10. The wireless radar sensor of claim 1, wherein the continuous wave Doppler radar is an AC-coupled continuous wave Doppler radar.

11. The wireless radar sensor of claim 1, further comprising:

a multiple radar configuration.

12. The wireless radar sensor of claim 11, wherein the multiple radar configuration includes: a two radar configuration.

13. The wireless radar sensor of claim 11, wherein the multiple radar configuration includes: a four radar configuration.

14. A wireless radar sensing system for storm surge tracking and tidal zone assessment comprising:

two or more wireless radar sensors in communication, each wireless radar sensor including:

a signal generator to generate a microwave signal, wherein the microwave signal comprises a continuous wave signal, a transmitting antenna to transmit the generated continuous wave signal without frequency modulation towards a surface of a moving target of water, a receive antenna to receive a reflected continuous wave signal without frequency modulation from the surface of the moving target, the reflected continuous wave signal having distance-dependent phase modulation, a mixer for combining the generated signal with the received signal to form a mixed analog signal, a converter to convert the mixed analog signal to a digital data, a differentiate and cross-multiply (DACM) demodulator to recover water level information from phase information of the digital data, and a radio and antenna for transmitting the recovered water level information as transmitted data to a base station; and the base station being configured to receive the transmitted data and to process the transmitted data to determine a surface level of the moving target.

15. A method for wave and water level measurement comprising the steps of:

generating a continuous wave signal and transmitting the continuous wave signal without frequency modulation toward a moving target of water;

receiving a reflected signal from the moving target, the reflected signal having distance-dependent phase modulation;

mixing the generated signal and received signal, down converting the mixed signal to a baseband signal;

converting the baseband signal to a digital data;

processing the digital data with a differentiate and cross-multiply (DACM) demodulator to recover water level information from phase information of the digital data, and transmitting the recovered water level information as transmitted data to a local personal computing device or a base station; and processing the transmitted data at the local personal computing device or the base station to determine a surface level of the moving target.

16. The wave and water level measurement method of claim 15, including the step of:

sampling at a rate of approximately 40 Hz.

17. The wave and water level measurement method of claim 15, wherein the generating step including the step of generating an approximately 2.4 GHz continuous microwave signal.

* * * * *